US012600310B2

(12) United States Patent (10) Patent No.: US 12,600,310 B2
Park et al. (45) Date of Patent: Apr. 14, 2026

(54) FRONT END MODULE FRAME OF VEHICLE

(71) Applicants: Hyundai Motor Company, Seoul (KR); Kia Corporation, Seoul (KR); HYUNDAI MOBIS CO., LTD., Seoul (KR)

(72) Inventors: Tae Ou Park, Seongnam-si (KR); Do Hoi Kim, Sejong-si (KR); Jae Sup Byun, Seongnam-si (KR); Jang Ho Kim, Seoul (KR)

(73) Assignees: Hyundai Motor Company, Seoul (KR); Kia Corporation, Seoul (KR); HYUNDAI MOBIS CO., LTD., Seoul (KR)

( * ) Notice: Subject to any disclaimer, the term of this patent is extended or adjusted under 35 U.S.C. 154(b) by 411 days.

(21) Appl. No.: 18/218,235

(22) Filed: Jul. 5, 2023

(65) Prior Publication Data

US 2024/0227708 A1 Jul. 11, 2024

(30) Foreign Application Priority Data

Jan. 10, 2023 (KR) ........................ 10-2023-0003488

(51) Int. Cl.
  *B62D 25/08* (2006.01)
  *B60R 19/02* (2006.01)
  (Continued)

(52) U.S. Cl.
  CPC ............ *B60R 19/023* (2013.01); *B60R 19/34* (2013.01); *B62D 25/085* (2013.01); *B60R 2019/1806* (2013.01)

(58) Field of Classification Search
  CPC .... B62D 21/15; B62D 21/152; B62D 21/155; B62D 25/08; B62D 25/084; B62D 25/085;
  (Continued)

(56) References Cited

U.S. PATENT DOCUMENTS 6,059,331 A * 5/2000 Mori .................... B62D 21/152
  296/187.05
9,630,655 B1 * 4/2017 Lee ...................... B62D 29/046
  (Continued)

FOREIGN PATENT DOCUMENTS

KR 10-1277861 B1 6/2013
KR 10-2020-0128922 A 11/2020

*Primary Examiner* — Gregory A Blankenship
(74) *Attorney, Agent, or Firm* — Morgan, Lewis & Bockius LLP

(57) ABSTRACT

A front end module frame of a vehicle, and the front end module frame including a lower member arranged at a front lower portion of the vehicle and extending in a vehicle width direction, wherein each of opposite ends thereof is connected to a front end of a front sub frame of the vehicle, a front bumper beam extending in the width direction, and connected to the lower member in a vehicle height direction, wherein each of opposite ends thereof is connected to a front end of a front side member of the vehicle, and an upper member arranged at a front upper portion of the vehicle and extending in the width direction, and connected to the front bumper beam in the height direction, wherein each of opposite ends thereof is bent toward the vehicle and connected to a fender apron member of the vehicle is introduced.

15 Claims, 10 Drawing Sheets

(51) Int. Cl.
    *B60R 19/18*       (2006.01)
    *B60R 19/34*       (2006.01)

(58) Field of Classification Search
    CPC ......... B60R 19/24; B60R 19/26; B60R 19/34;
             B60R 19/262; B60R 2019/245; B60R
                                      2019/247
    USPC ............... 293/132–134; 296/187.09, 193.09,
                                       296/203.02
    See application file for complete search history.

(56)                 References Cited

U.S. PATENT DOCUMENTS

| | | | | |
|---|---|---|---|---|
| 10,486,745 | B1 * | 11/2019 | Kim | B60R 19/18 |
| 12,291,140 | B1 * | 5/2025 | Chisholm | B60Q 1/0035 |
| 2002/0129981 | A1 * | 9/2002 | Satou | B62D 35/02 |
| | | | | 180/68.6 |
| 2004/0222670 | A1 * | 11/2004 | Andre | B62D 25/084 |
| | | | | 296/193.09 |
| 2006/0249962 | A1 * | 11/2006 | Gonzalez | B60R 19/34 |
| | | | | 293/133 |
| 2007/0284076 | A1 * | 12/2007 | Lorenzo | B62D 29/001 |
| | | | | 165/41 |
| 2008/0308333 | A1 * | 12/2008 | Kapadia | B60R 19/12 |
| | | | | 293/115 |
| 2009/0159353 | A1 * | 6/2009 | Kerkewitz | B62D 25/084 |
| | | | | 403/24 |
| 2009/0261601 | A1 * | 10/2009 | Shin | B62D 25/084 |
| | | | | 293/120 |
| 2010/0213742 | A1 * | 8/2010 | Ritz | B62D 25/084 |
| | | | | 296/193.09 |
| 2011/0037292 | A1 * | 2/2011 | Owen | B62D 25/084 |
| | | | | 296/203.02 |
| 2011/0304176 | A1 * | 12/2011 | Kihara | B60K 11/04 |
| | | | | 29/890.03 |
| 2014/0008924 | A1 * | 1/2014 | Han | F16F 7/12 |
| | | | | 293/133 |
| 2014/0042775 | A1 * | 2/2014 | Steinmetz | F16F 7/121 |
| | | | | 188/377 |
| 2014/0062107 | A1 * | 3/2014 | Kim | B60R 19/34 |
| | | | | 293/133 |
| 2014/0132033 | A1 * | 5/2014 | Townson | B62D 27/06 |
| | | | | 296/193.1 |
| 2015/0054307 | A1 * | 2/2015 | Kito | B60R 21/34 |
| | | | | 296/187.04 |
| 2015/0232050 | A1 * | 8/2015 | Yamada | B60R 19/34 |
| | | | | 296/187.1 |
| 2015/0343973 | A1 * | 12/2015 | Stoenescu | B60R 19/12 |
| | | | | 293/133 |
| 2016/0121830 | A1 * | 5/2016 | Rabe | B60R 19/34 |
| | | | | 293/133 |
| 2017/0021866 | A1 * | 1/2017 | Kim | B62D 21/03 |
| 2019/0143920 | A1 * | 5/2019 | Nakamoto | B60K 11/04 |
| | | | | 296/193.09 |
| 2020/0148267 | A1 * | 5/2020 | Yashiro | B62D 25/08 |
| 2020/0324820 | A1 * | 10/2020 | Kim | B62D 25/08 |
| 2021/0024133 | A1 * | 1/2021 | Kim | B62D 21/08 |
| 2021/0253172 | A1 * | 8/2021 | Shimoda | B62D 21/152 |
| 2022/0204086 | A1 * | 6/2022 | Anzai | B62D 27/00 |
| 2022/0219597 | A1 * | 7/2022 | Kang | B60Q 1/0433 |
| 2024/0227708 | A1 * | 7/2024 | Park | B60R 19/023 |
| 2024/0351637 | A1 * | 10/2024 | Mangold | B62D 25/085 |
| 2024/0391530 | A1 * | 11/2024 | Park | B62D 25/085 |
| 2025/0026412 | A1 * | 1/2025 | Nagasawa | B62D 21/152 |
| 2025/0115309 | A1 * | 4/2025 | Horvatic | B60R 19/34 |

* cited by examiner

FRONT END MODULE FRAME OF VEHICLE

CROSS REFERENCE TO RELATED APPLICATION

The present application claims priority to Korean Patent Application No. 10-2023-0003488 filed on Jan. 10, 2023, the entire contents of which is incorporated herein for all purposes by this reference.

BACKGROUND

Technical Field

The present disclosure relates to a front end module frame of a vehicle. More particularly, the present disclosure relates to a front end module frame of a vehicle, the front end module being arranged at a front portion of the vehicle to fix a part of the vehicle, and even in a structure in which a fender apron member is bent toward and connected to a front portion of a front side member, being capable of reducing energy transferred to passengers in the vehicle in the event of a frontal collision of the vehicle.

Description of the Related Art

Recently, with the spread of electric vehicles, social concern for environmental issues, and the increase in single-person households, micro-vehicles in the concept of a personal mobility are expanding greatly. However, in the case of the micro-vehicles, since a front overhang thereof has a very short design, the reality is that the space for absorbing shock in a collision is very insufficient.

When the shock absorbing space of the front structure of the vehicle is insufficient, the shock caused by the collision is transferred to all passengers, increasing the injury rate of the passengers.

Meanwhile, in the case of the micro-vehicles, since the fender apron member is formed in a straight shape, it is easy to respond to a frontal collision at a front portion of the vehicle by configuring a crash box. However, in the case of medium-sized or large-sized vehicles, since the fender apron member is bent and connected to a front portion of the front side member, it is difficult to form the space for the crash box and to respond to a frontal collision of the vehicle.

Accordingly, even in a vehicle with a structure in which the fender apron member is bent forward of and connected to the front side member, there is a need for a method for configuring the front end module frame to easily respond to a frontal collision of the vehicle.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a front end module frame of a vehicle, the front end module frame being arranged at a front portion of the vehicle to fix a part of the vehicle, and being capable of reducing energy transferred to passenger inside the vehicle in the event of a frontal collision of the vehicle even in a structure in which a fender apron member is bent toward and connected to a front portion of a front side member.

The technical problem to be achieved in the present disclosure is not limited to the above mentioned, and other problem not mentioned will be clearly understood by those skilled in the art from the description below.

As a means for solving the above-described technical problem, according to the present disclosure, there is provided a front end module frame of a vehicle, the front end module frame including: a lower member configured to be arranged at a front lower portion of the vehicle and extending in a width direction of the vehicle, and each of opposite ends of the lower member may be configured to connect to a front end of a front sub frame of the vehicle; a front bumper beam extending in the width direction of the vehicle, and connected to the lower member in a height direction of the vehicle, and each of opposite ends of the front bumper beam may be configured to connect to a front end of a front side member of the vehicle; and an upper member connected to the front bumper beam in the height direction of the vehicle and configured to be arranged at a front upper portion of the vehicle and extending in the width direction of the vehicle, and each of opposite ends of the upper member may be configured to bend toward the vehicle and connect to a fender apron member of the vehicle.

The lower member may include a lower crash box configured to connect to the front end of the front sub frame, and a front end of the lower crash box may be connected to the lower member.

The lower crash box may include a rod-shaped lower shock absorbing part and a lower flange part at a rear end of the lower shock absorbing part, and the lower flange part may be configured to connect to the front end of the front sub frame.

The front bumper beam may include a connecting part configured to connect to a point facing the front end of the front side member so that the front bumper beam and the front side member may constitute a front load path.

The upper member may include an upper crash box configured to connect to a front end of the fender apron member, and a front end of the upper crash box may be connected to the upper member.

The upper crash box may include a rod-shaped upper shock absorbing part and an upper flange part at a rear end of the upper shock absorbing part, and the upper flange part may be configured to connect to the front end of the fender apron member.

The fender apron member may have an inclined portion such that the front end thereof may be connected to the front side member, and a fender crash box may protrude from the inclined portion.

The upper crash box may be configured to match with the fender crash box so that the upper member and the fender apron member may be connected to each other.

An end of the upper member may have a concave shape so that the upper flange part may be configured to connect to the front end of the fender apron member by bolting at a front portion of the upper member.

The upper member may include an upper crash box connected to a rear surface of each of the opposite ends of the upper member, and a bead to reinforce stiffness between the opposite ends of the upper member and in a rear surface of the upper member.

The upper member may be a metal frame that may be an integral body, and may have an internal space with an open rear surface, and the bead may be disposed in the internal space of the upper member.

The lower member and the upper member may be metal frames, and the bead includes a plastic material and is disposed in an internal space of the upper member.

The front end module frame may further include: an insulator configured to connect a radiator located inside the front bumper beam to both the lower member and the upper member.

The bead may include an insert nut integral with the bead and disposed at a lateral portion of the bead, and the insulator fastens to the insert nut to support an upper portion of the radiator.

The bead may include an insert nut integral with the bead and disposed at a center portion of the bead, and a hood latch fastened to the insert nut to support a vehicle hood secured to the hood latch from below.

The lower member may include a weld nut integral with the lower member and disposed at a lateral portion of the lower member, and the insulator fastens to the weld nut to support a lower portion of the radiator.

According to the front end module frame of the vehicle of the present disclosure, the present disclosure is proposed to solve the above problem, and the front end module frame of the vehicle is arranged at the front portion of the vehicle to fix a part of the vehicle, and the front end module frame can reduce energy transferred to passengers inside the vehicle in the event of a frontal collision of the vehicle even in the structure in which the fender apron member is bent toward and connected to the front portion of the front side member.

The effect obtainable in the present disclosure is not limited to the above mentioned, and other effects not mentioned will be clearly understood by those skilled in the art from the description below.

DETAILED DESCRIPTION

Figure 1:
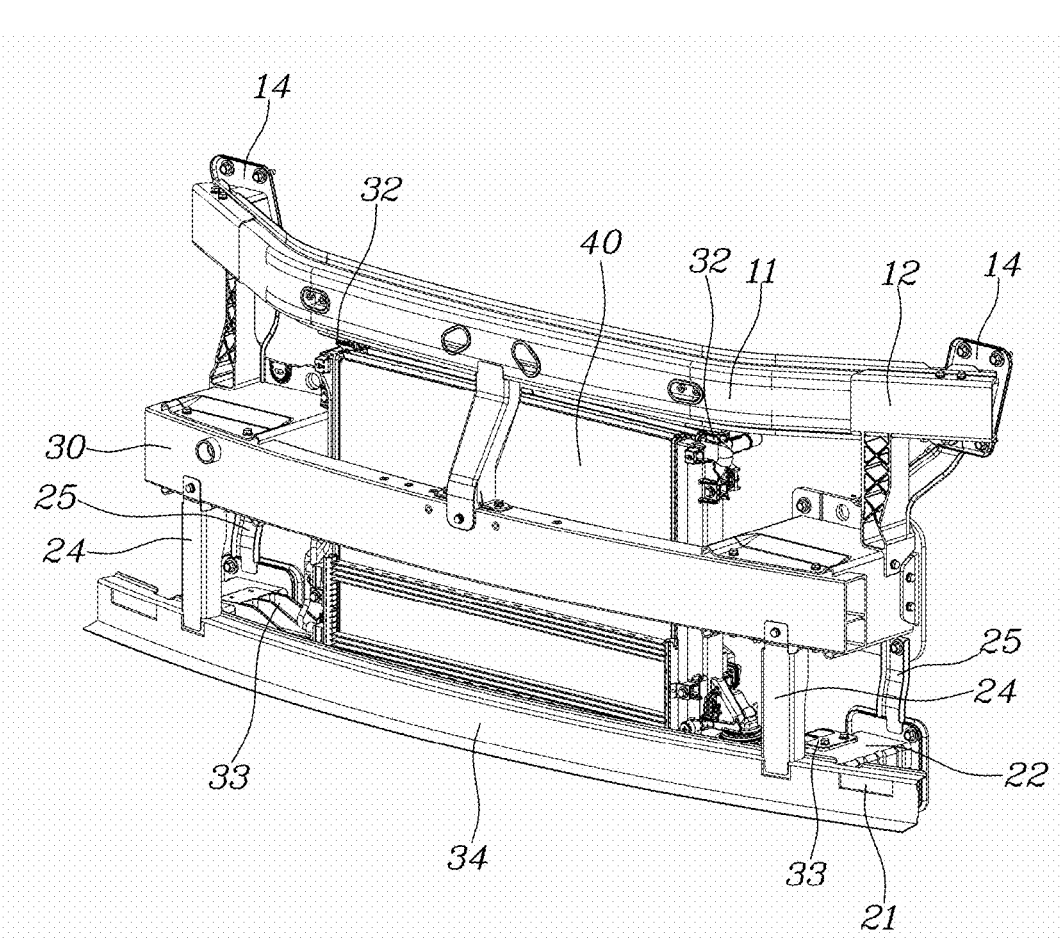
FIG. 1 is a view showing a front end module frame of a vehicle according to an embodiment of the present disclosure.

Hereinbelow, preferred embodiments described in the specification will be described in detail with reference to accompanying drawings, and regardless of the reference numerals, the same reference numerals will refer to the same or like parts, and redundant descriptions thereof will be omitted.

The suffixes "module" and "part" for the components used in the following description are given or mixed in consideration of only the ease of writing the specification, and do not have distinct meanings or roles by themselves.

In the following description, if it is decided that the detailed description of known function or configuration related to the disclosure makes the subject matter of the disclosure unclear, the detailed description is omitted. Furthermore, the accompanying drawings are only for understanding of the preferred embodiment of the present disclosure, and the technical ideas disclosed in the specification are not limited by the accompanying drawings, and those skilled in the art will appreciate that various modifications, additions and substitutions are possible, without departing from the scope and spirit of the invention as disclosed in the accompanying claims. It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

According to an embodiment of the present disclosure, there is provided a front end module frame of a vehicle, even in a vehicle with a structure in which a fender apron member is bent toward and connected to a front portion of a front side member, the front end module frame being configured to reduce energy transferred to passengers inside the vehicle in the event of a frontal collision of the vehicle.

FIG. 1 is a view showing a front end module frame of a vehicle according to an embodiment of the present disclosure. FIG. 1 shows mainly components related to the embodiment, and in order to actually realize the front end module frame of the vehicle, the front end module frame may include components less or greater than the embodiment.

Referring to FIG. 1, the front end module frame of the vehicle according to the embodiment may include an upper member 10, a lower member 20, and a front bumper beam 30.

First, the lower member 20 constituting the front end module frame of the vehicle will be described. Each of opposite ends of the lower member 20 may be connected to a front end of a front sub frame 200 of the vehicle at a front lower portion of the vehicle. By the structure, the lower member 20 is transferred first with shock in the event of a frontal collision of the vehicle, and then may transfer the transferred shock to the front bumper beam 30 and the upper member 10, which will be described below. Furthermore, a lower stiffener 34 is provided at a lower portion of the front end module frame, and has a structure that encloses the lower member 20 at the front of the vehicle. The lower stiffener 34 is made of a plastic material and may reduce shock applied to the vehicle in the event of a frontal collision of the vehicle.

Meanwhile, a lower crash box 27 is connected to a rear surface of each of the opposite ends of the lower member 20 and may include a lower shock absorbing part 22 and a lower flange part 23. The lower shock absorbing part 22 may be formed in a rod shape and be dented in a longitudinal direction of the vehicle in the event of a frontal collision of the vehicle to reduce shock of the collision. Furthermore, the lower flange part 23 is formed at a rear end of the lower shock absorbing part 22 and may be connected to the front end of the front sub frame 200. Accordingly, in the event of a frontal collision of the vehicle, transfer of shock from the lower member 20 to the front sub frame 200 may be efficiently performed.

Furthermore, the front bumper beam 30 extends in a width direction of the vehicle, and may be connected to the lower member in a height direction of the vehicle. Opposite side portions of the front bumper beam 30 extend toward a rear portion of the vehicle and each of opposite ends of the front bumper beam 30 may be connected to a front side member 300 of the vehicle. At this point, a front portion of the front bumper beam 30 may be connected to the lower member 20 vertically via a lower front bracket 24, and a rearward-extending portion thereof may be connected to the lower member 20 vertically via a lower rear bracket 25. The lower rear bracket 25 may be formed such that a center portion thereof is bent along the rearward-extending portion of the front bumper beam 30.

Furthermore, the upper member 10 is arranged at a front upper portion of the vehicle and extends in the width direction of the vehicle, and may be connected to the front bumper beam 30 in the height direction of the vehicle. The upper member 10 and the front bumper beam 30 may be connected to each other via a bead 12 that is insert-injected to an internal space of the upper member 10. The upper member 10 may be located at a position further rear than the lower member 20 and the front bumper beam 30 on the basis of the longitudinal direction of the vehicle. By the structure, the shock transferred to the lower member 20 may be transferred to the front bumper beam 30 and the upper member in order. At this point, each of opposite ends of the upper member 10 may be bent toward the vehicle to be connected to a front end of a fender apron member 100 of the vehicle. By the shape of the upper member 10, a structure such as an upper crash box 16, which will be described below, may be adopted to a vehicle with a structure in which the fender apron member 100 is bent and connected to a front portion of the front side member 300 so that energy transferred to passengers in the vehicle in the event of a frontal collision of the vehicle can be reduced.

Furthermore, a radiator 40 is provided inside the lower member 20, the front bumper beam 30, and the upper member 10 to dissipate heat generated from the vehicle. Conventionally, unlike the front end module frame of the vehicle with a separate space for the radiator 40 to be mounted, in the present disclosure, instead of the mounting space of the radiator 40, the radiator 40 may be connected to both of the lower member 20 and the upper member 10 via an insulator. The insulator will be described below.

Hereinbelow, each component will be described in detail.

Figure 2:
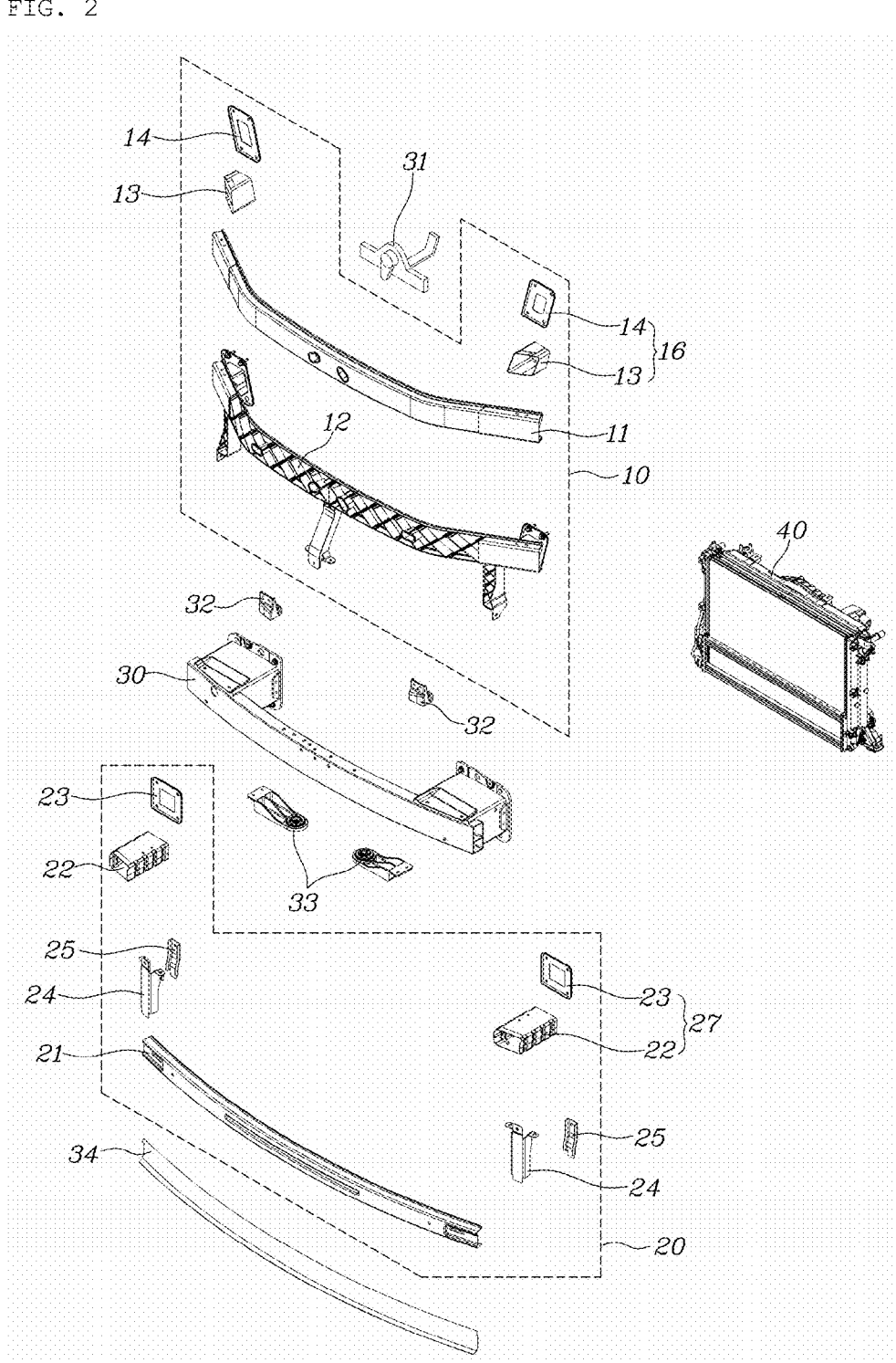
FIG. 2 is a view showing configuration of the front end module frame of the vehicle according to the embodiment of the present disclosure.

FIG. 2 is a view showing configuration of the front end module frame of the vehicle according to the embodiment of the present disclosure.

Referring to FIG. 2, the lower member 20 may include components as follows. First, a lower beam 21 is connected in the width direction of the vehicle. As described above, the lower stiffener 34 may be formed in the structure that encloses the lower beam 21 from the front of the lower beam. Opposite portions of the lower beam 21 may extend rearward, and each of the opposite portions constitutes the lower crash box 27. The lower member may be provided such that the lower front bracket 24 and the lower rear bracket 25 are welded and then assembled with each other by bolting in a T direction.

Furthermore, the upper member 10 may include components as follows. First, an upper beam 11 extends in the width direction of the vehicle. Furthermore, the upper crash box 16 is connected to a rear surface of each of the opposite ends of the upper member 10 and may include an upper shock absorbing part 13 and an upper flange part 14. The upper shock absorbing part 13 may be formed in a rod shape and be dented in the longitudinal direction of the vehicle in the event of a frontal collision of the vehicle to reduce shock of the collision.

Furthermore, the upper flange part 14 may be formed at a rear end of the upper shock absorbing part 13 and may be connected to the front end of the fender apron member 100. By the structure, in the event of a frontal collision of the vehicle, transfer of the shock from the upper member 10 to the fender apron member 100 can be efficiently performed. The upper member 10 may be assembled by bolting in L, T, and H directions via the upper flange part 14 and the bead 12.

Furthermore, the bead 12 may be formed at a section between points to which upper crash boxes 16 are connected. The bead 12 may be a structure for stiffness reinforcement, and may be formed of a plastic material. The stiffness of the upper member 10 may be increased through the bead 12 insert-injected to the internal space of the upper member 10. Each of the lower member 20 and the upper member 10 described above may consist of a metal (steel) frame secured with the stiffness.

Meanwhile, a rear connecting part of the front bumper beam 30 is connected to a point facing the front end of the front side member 300 so that the front bumper beam 30 and the front side member 300 may constitute the front load path. In the event of a frontal collision of the vehicle, shock transferred from the lower member 20 is transferred to both of the front bumper beam 30 and the upper member 10 to respectively provide load paths that transfer the shock to the front side member 300 and the fender apron member 100.

The front end module frame of the vehicle described above may be assembled in the T direction, i.e., the longitudinal direction of the vehicle, to secure the assembly of a front vehicle body in a line. Furthermore, bolting fastening may be performed by fastening bolts 51 at left and right portions of the lower member 20, left and right portions of the front bumper beam 30, and left and right portions and a left surface of the upper member 10.

Figure 3:
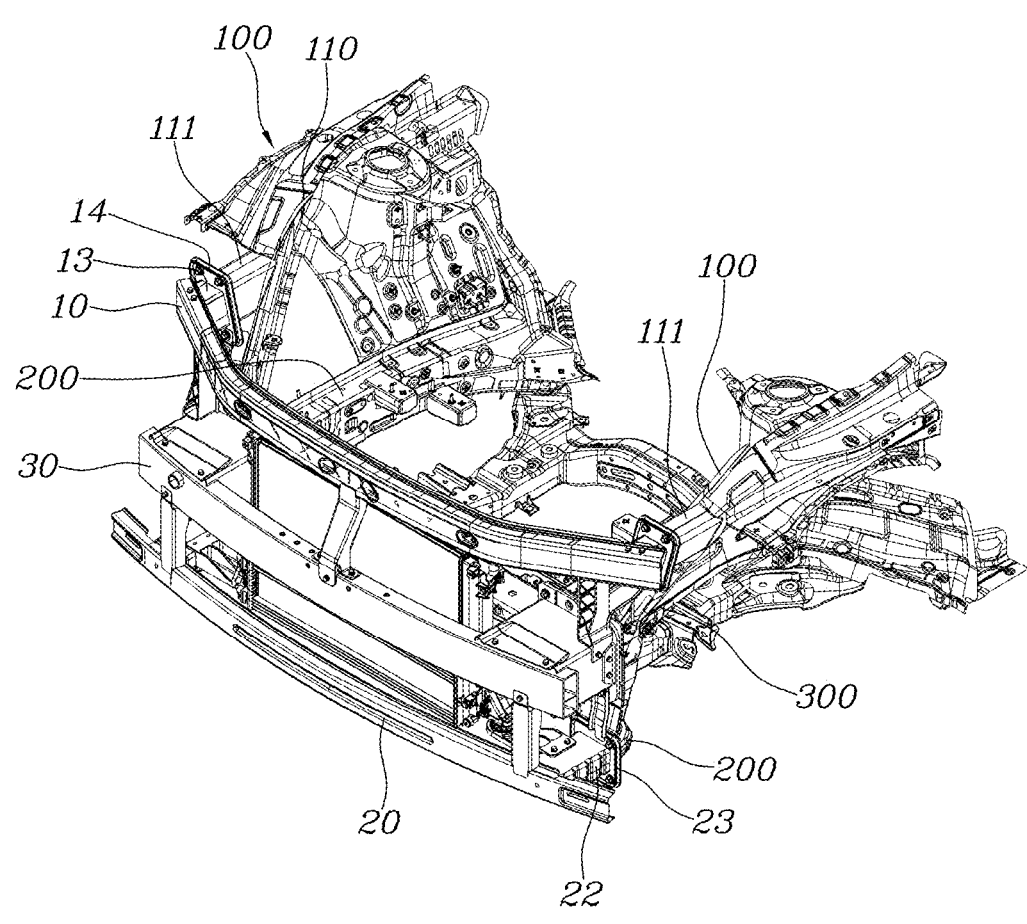
FIG. 3 is a view showing connection of the front end module frame of the vehicle according to the embodiment of the present disclosure, with a fender apron member, a front sub frame, and a front side member.

FIG. 3 is a view showing connection of the front end module frame of the vehicle according to the embodiment of the present disclosure, with the fender apron member 100, the front sub frame 200, and the front side member 300.

Referring to FIG. 3, an inclined portion 110 may be formed in the fender apron member 100 such that the front end of the fender apron member 100 is connected to the front side member 300 located below the fender apron member 100. Furthermore, a fender crash box 111 is formed by protruding on the inclined portion 110 toward the front portion of the vehicle, so that energy transferred to the passengers in the vehicle in the event of a frontal collision of the vehicle can be reduced.

Furthermore, the fender crash box 111 is arranged to match with the upper crash box 16 so that the fender apron member 100 and the upper member 10 are connected to each other. Accordingly, the load path that transfers shock transferred to the upper member 10 to the fender apron member 100 in the event of a frontal collision of the vehicle may be provided.

Figure 4:
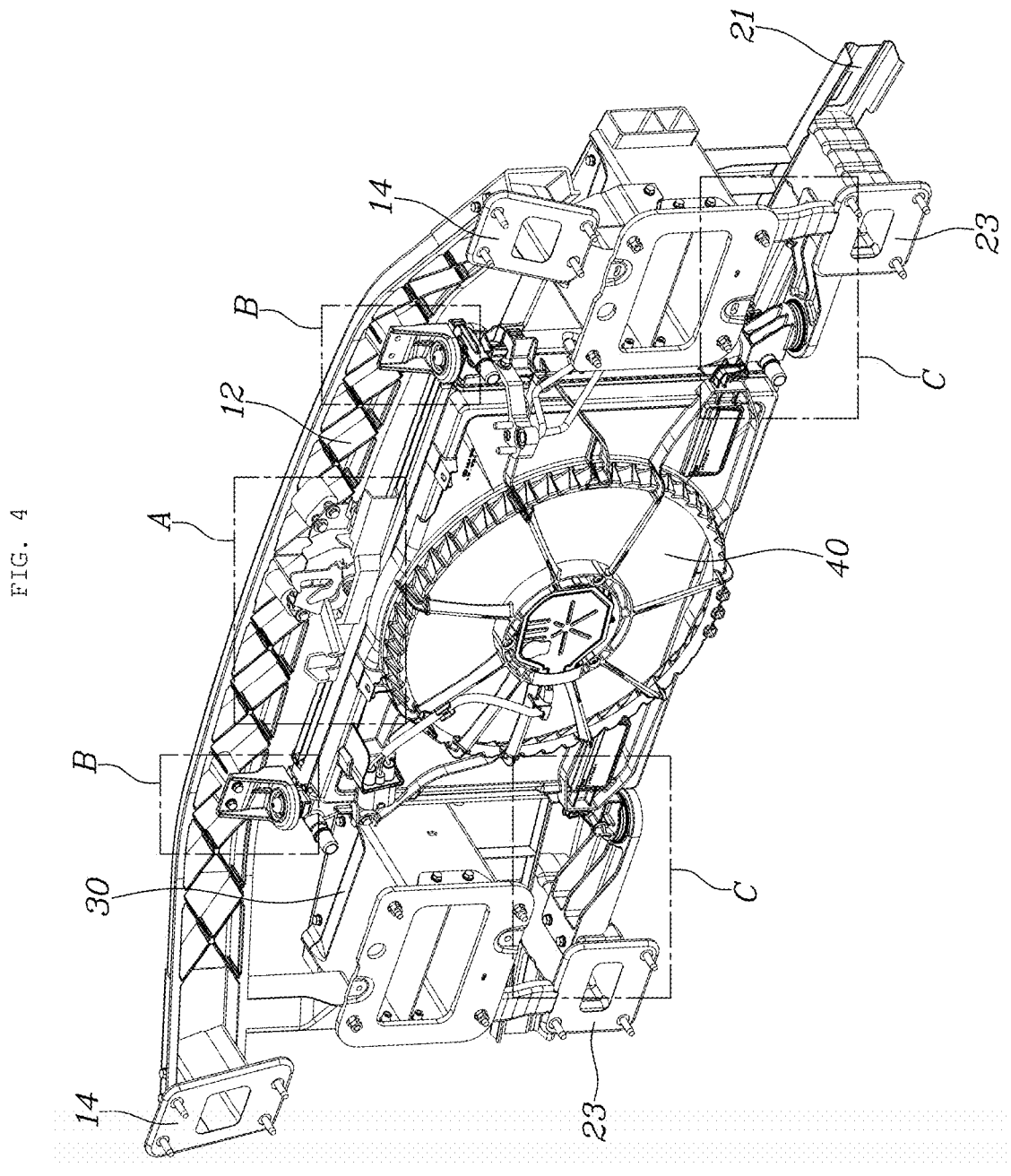
FIG. 4 is a rear view showing the front end module frame of the vehicle according to the embodiment of the present disclosure.

FIG. 4 is a rear view showing the front end module frame of the vehicle according to the embodiment of the present disclosure. Referring to FIG. 4, as described above, it is shown that the internal space with an open rear surface of the upper member 10 is formed, and the bead 12 is insert-injected to the internal space.

Hereinbelow, region A, region B, and region C in FIG. 4 will be described with reference to FIGS. 5 to 9.

Figure 5:
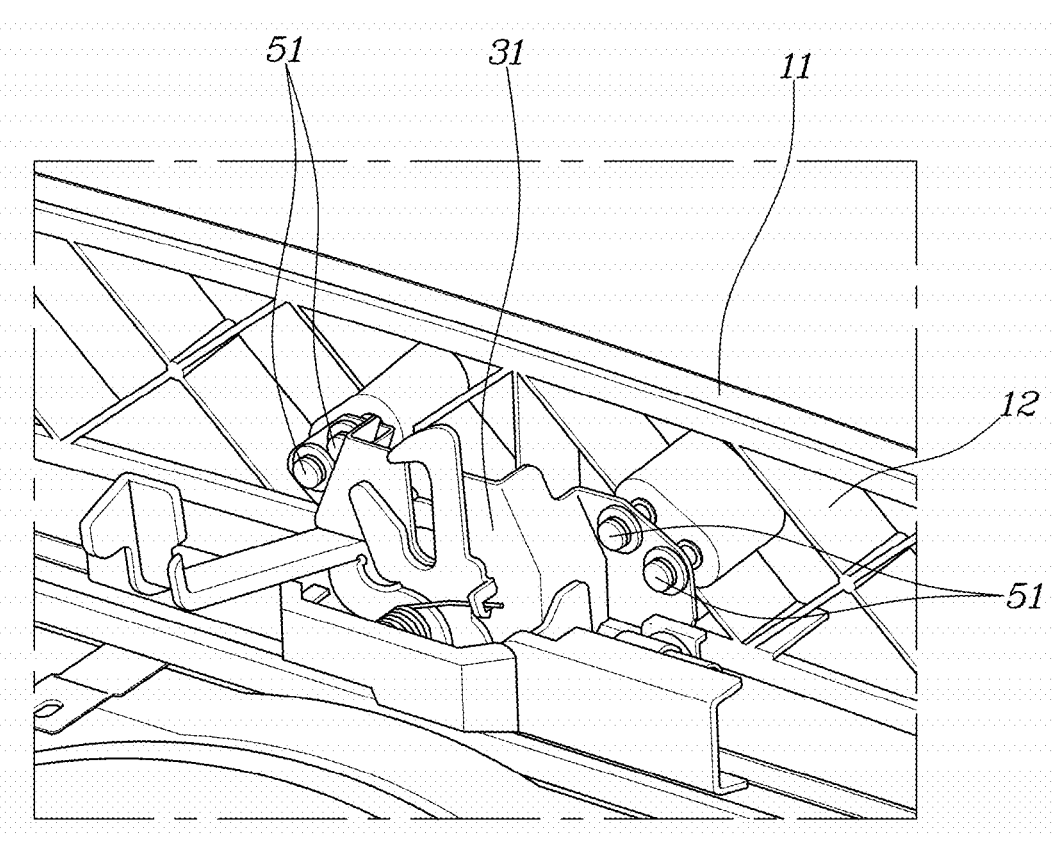
FIG. 5 is an enlarged view showing region A of FIG. 4 according to the embodiment of the present disclosure.

FIG. 5 is an enlarged view showing region A of FIG. 4 according to the embodiment of the present disclosure.

Referring to FIG. 5, the view shows a hood latch 31 that supports a vehicle hood from below. The hood latch 31 is a structure that holds the vehicle hood covering an engine room so that the engine room is not opened, and the hood latch 31 may be fastened to an insert nut 15 behind the upper member 10. The insert nut 15 may be integrally formed with the bead 12 at a center portion of the bead 12 during the insert-injection of the bead 12. The hood latch 31 has a structure that connects a center portion of the upper member 10 to a center portion of the front bumper beam so that the hood latch 31 may endure the stiffness higher than a carrier of the conventional front end module frame.

Figure 6:
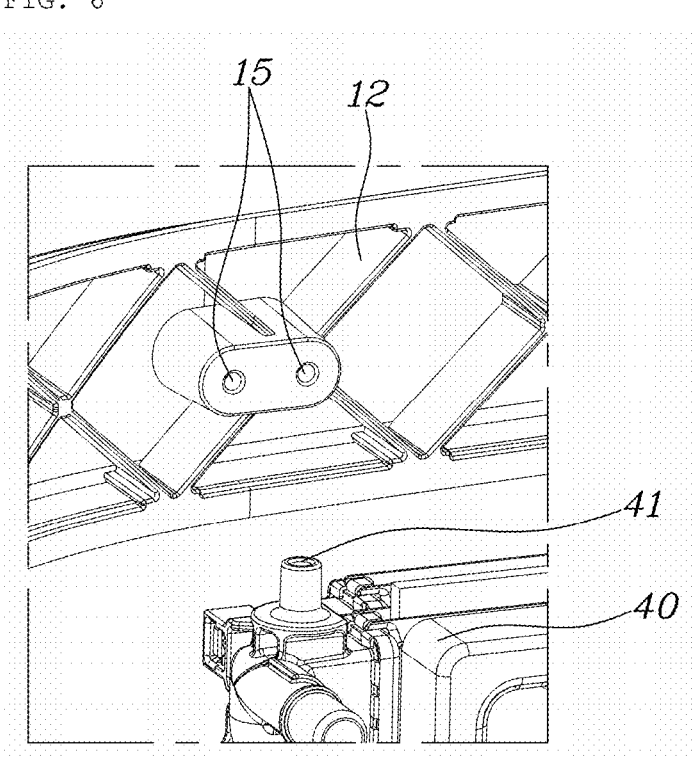
FIGS. 6 and 7 are enlarged views showing region B of FIG. 4 according to the embodiment of the present disclosure.
Figure 7:
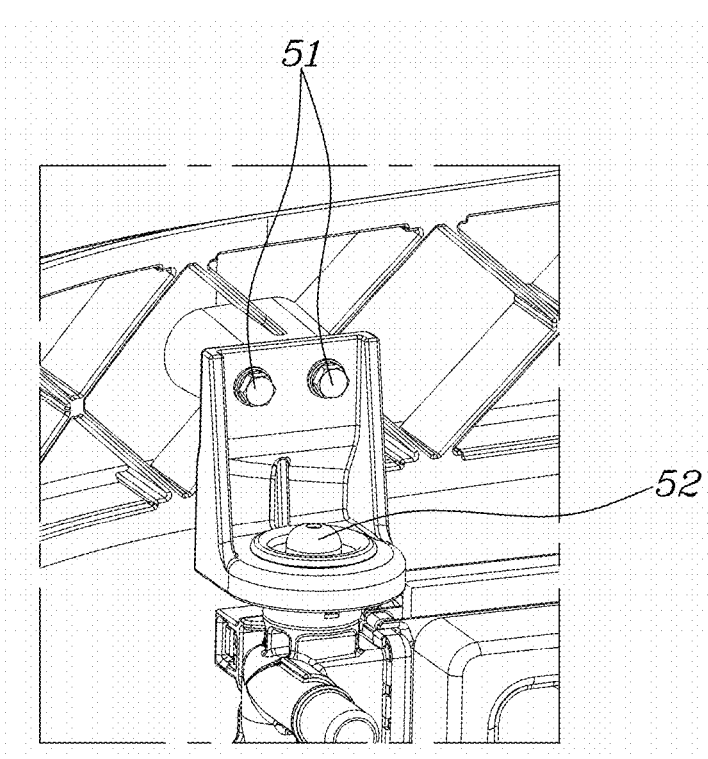

FIGS. 6 and 7 are enlarged views showing region B of FIG. 4 according to the embodiment of the present disclosure.

FIGS. 6 and 7 are views showing before and after of assembly an upper insulator. The insulator may connect the radiator 40 to both of the lower member 20 and the upper member 10. At this point, the insulator may include an upper insulator 32 connecting the radiator 40 to the upper member 10 and a lower insulator 33 connecting the radiator 40 to the lower member 20.

Referring to FIG. 7, when the upper insulator 32 is fastened to the insert nut 15 integrally formed with a lateral portion of the bead 12, the upper insulator 32 is coupled to a protrusion 41 at an upper end of the radiator 40 so that an upper portion of the radiator 40 may be supported. The protrusion 41 of the radiator 40 may be sealed with a fixing part 52 in a fastened state to the insert nut 15. At this point, the fixing part 52 is formed of a rubber material and may flexibly respond to shock of a frontal collision of the vehicle.

Figure 8:
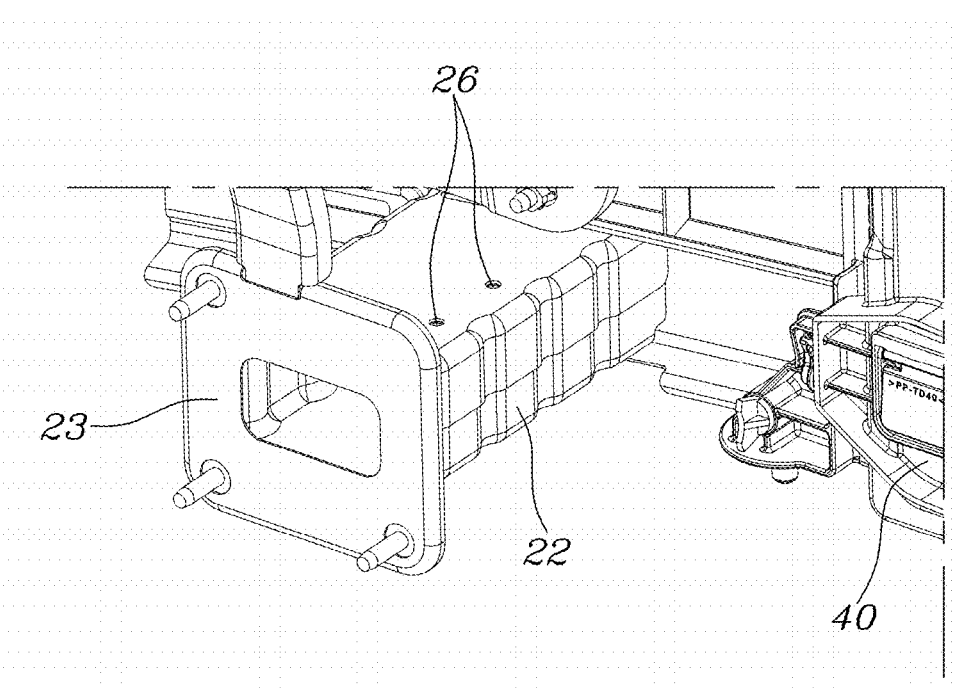
FIGS. 8 and 9 are enlarged view showing region C of FIG. 4 according to the embodiment of the present disclosure.
Figure 9:
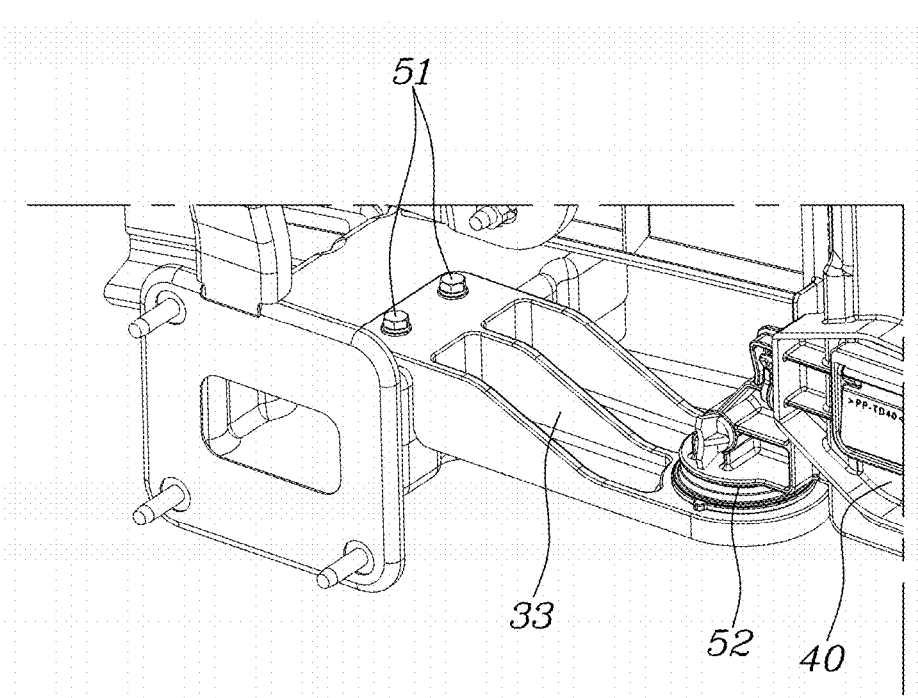

FIGS. 8 and 9 are enlarged view showing region C of FIG. 4 according to the embodiment of the present disclosure.

FIGS. 8 and 9 are views showing before and after of assembly of the lower insulator 33. When the lower insulator 33 is fastened to a weld nut 26 integrally formed at a lateral portion of the lower member 20, the lower insulator 33 is coupled to a lower end of the radiator 40 so that a lower portion of the radiator 40 may be supported. The lower end of the radiator 40 may be sealed with the fixing part 52 while being fastened to the lower insulator 33.

The insert nut 15 and the weld nut 26 described above are provided at left and right spaces of the radiator 40 so that the radiator 40 may be fitted assembled from above, and the radiator 40 may be supported in a vertical direction while being assembled. Accordingly, the vehicle frontal collision energy absorbing structure via the upper member 10 of the present disclosure may serve as the conventional FEM carrier.

Figure 10:
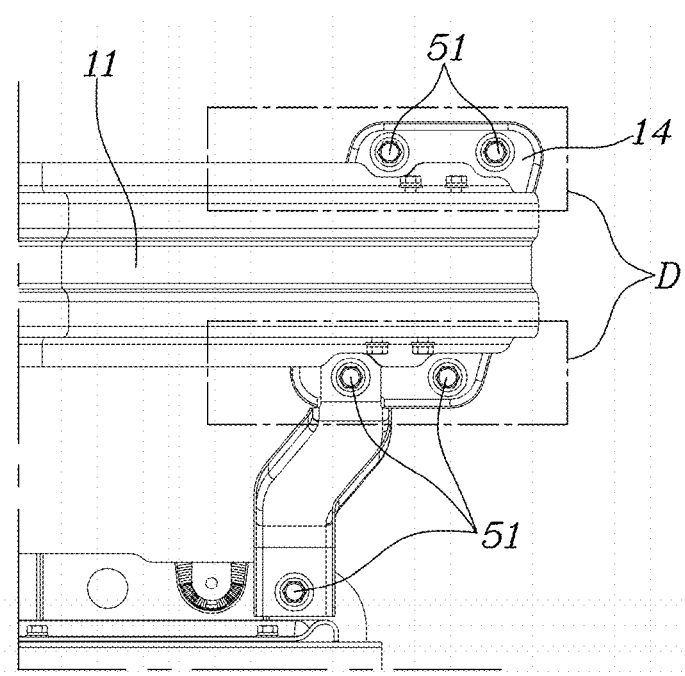
FIG. 10 is a view showing a shape of an end of an upper member according to the embodiment of the present disclosure.

FIG. 10 is a view showing a shape of an end of the upper member 10 according to the embodiment of the present disclosure.

Referring to region D in FIG. 10, each end of the upper member 10 has a concave shape such that the upper flange part 14 and the front end of the fender apron member 100 are connected to each other by bolting at the front space of the upper member 10. The shape is a structure to be designed for a tool inserting path to avoid such that a bolt is inserted from the front thereof and assembled, and through the above designed structure, level of assembly difficulty in the T direction, which is forward of the vehicle, may be reduced in the state where the lower member 20, the front bumper beam 30, and the upper member 10 are assembled.

Meanwhile, the stiffness of a member that is connected from the upper member 10 to the vehicle body is optimized to improve the effect. For example, a front portion is preferably made of a material with less stiffness, and a rear portion is preferably made of a material with larger stiffness than the front portion. Therefore, as sequential deformation from the front portion is induced, more energy may be absorbed at the front portion.

According to the embodiments of the present disclosure described above, the front end module frame is arranged at the front portion of the vehicle and fixes the component of the vehicle, and even in the structure in which the fender apron member is bent toward the front portion of the front side member, energy transferred to the passengers inside the vehicle in the frontal collision of the vehicle can be reduced.

Although the preferred embodiment of the present disclosure have been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. A front end module frame of a vehicle, the front end module frame comprising:

a lower member configured to be arranged at a front lower portion of the vehicle and extending in a width direction of the vehicle, wherein each of opposite ends of the lower member is configured to connect to a front end of a front sub frame of the vehicle;

a front bumper beam extending in the width direction of the vehicle, and connected to the lower member in a height direction of the vehicle, wherein each of opposite ends of the front bumper beam is configured to connect to a front end of a front side member of the vehicle; and an upper member connected to the front bumper beam in the height direction of the vehicle and configured to be arranged at a front upper portion of the vehicle and extending in the width direction of the vehicle, wherein each of opposite ends of the upper member is configured to bend toward the vehicle and connect to a fender apron member of the vehicle, wherein the fender apron member has an inclined portion such that a front end of the fender apron member is connected to the front side member, and a fender crash box protrudes from the inclined portion.

2. The front end module frame of claim 1, wherein the lower member includes a lower crash box configured to connect to the front end of the front sub frame, and a front end of the lower crash box is connected to the lower member.

3. The front end module frame of claim 2, wherein the lower crash box comprises a rod-shaped lower shock absorbing part and a lower flange part at a rear end of the lower shock absorbing part, and the lower flange part is configured to connect to the front end of the front sub frame.

4. The front end module frame of claim 1, wherein the front bumper beam includes a connecting part configured to connect to a point on the front bumper beam facing the front end of the front side member so that the front bumper beam and the front side member constitute a front load path.

5. The front end module frame of claim 1, wherein the upper member includes an upper crash box configured to connect to the front end of the fender apron member, and a front end of the upper crash box is connected to the upper member.

6. The front end module frame of claim 5, wherein the upper crash box comprises a rod-shaped upper shock absorbing part and an upper flange part at a rear end of the upper shock absorbing part, and the upper flange part is configured to connect to the front end of the fender apron member.

7. The front end module frame of claim 1, wherein the upper crash box is configured to match with the fender crash box so that the upper member and the fender apron member are connected to each other.

8. A front end module frame of a vehicle, the front end module frame comprising:

a lower member configured to be arranged at a front lower portion of the vehicle and extending in a width direction of the vehicle, wherein each of opposite ends of the lower member is configured to connect to a front end of a front sub frame of the vehicle;

a front bumper beam extending in the width direction of the vehicle, and connected to the lower member in a height direction of the vehicle, wherein each of opposite ends of the front bumper beam is configured to connect to a front end of a front side member of the vehicle; and an upper member connected to the front bumper beam in the height direction of the vehicle and configured to be arranged at a front upper portion of the vehicle and extending in the width direction of the vehicle, wherein each of opposite ends of the upper member is configured to bend toward the vehicle and connect to a fender apron member of the vehicle, wherein the upper member includes an upper crash box configured to connect to a front end of the fender apron member, wherein the upper crash box comprises a rod-shaped upper shock absorbing part and an upper flange part at a rear end of the upper shock absorbing part, and wherein an end of the upper member has a concave shape so that the upper flange part is configured to connect to the front end of the fender apron member by bolting at a front portion of the upper member.

9. The front end module frame of claim 1, wherein the upper member includes an upper crash box connected to a rear surface of each of the opposite ends of the upper member, and a bead to reinforce stiffness between the opposite ends of the upper member and in the rear surface of the upper member.

10. The front end module frame of claim 9, wherein the upper member is a metal frame that is an integral body, and has an internal space with an open rear surface, and the bead is disposed in the internal space of the upper member.

11. The front end module frame of claim 9, wherein the lower member and the upper member are metal frames, and the bead includes a plastic material and is disposed in an internal space of the upper member.

12. The front end module frame of claim 9, further comprising:

an insulator configured to connect a radiator located inside the front bumper beam to both the lower member and the upper member.

13. The front end module frame of claim 12, wherein the bead includes an insert nut integral with the bead and disposed at a lateral portion of the bead, and the insulator fastens to the insert nut to support an upper portion of the radiator.

14. The front end module frame of claim 12, wherein the bead includes an insert nut integral with the bead and disposed at a center portion of the bead, and a hood latch fastened to the insert nut to support a vehicle hood secured to the hood latch from below.

15. The front end module frame of claim 12, wherein the lower member includes a weld nut integral with the lower member and disposed at a lateral portion of the lower member, and the insulator fastens to the weld nut to support a lower portion of the radiator.

* * * * *